(12) United States Patent
Rajkotia et al.

(10) Patent No.: US 7,664,140 B2
(45) Date of Patent: Feb. 16, 2010

(54) EARLY TERMINATION OF LOW DATA RATE TRAFFIC IN A WIRELESS NETWORK

(75) Inventors: Amol Rajkotia, San Diego, CA (US); Ranganathan Krishnan, San Diego, CA (US); Joseph Patrick Burke, Carlsbad, CA (US)

(73) Assignee: Qualcomm Incorporated, San Diego, CA (US)

( * ) Notice: Subject to any disclaimer, the term of this patent is extended or adjusted under 35 U.S.C. 154(b) by 780 days.

(21) Appl. No.: 10/794,259

(22) Filed: Mar. 4, 2004

(65) Prior Publication Data

US 2005/0195849 A1 Sep. 8, 2005

(51) Int. Cl.
*H04J 3/24* (2006.01)
*H04J 3/16* (2006.01)
*H04J 3/22* (2006.01)

(52) U.S. Cl. .................. 370/473; 370/474; 370/465

(58) Field of Classification Search ............... 370/428, 370/208, 347, 216, 474, 473, 389; 455/422.1, 455/41.3
See application file for complete search history.

(56) References Cited

U.S. PATENT DOCUMENTS

| | | | | |
|---|---|---|---|---|
| 6,535,723 | B1 * | 3/2003 | Jiang et al. | 455/245.1 |
| 6,778,839 | B2 * | 8/2004 | Valkealahti | 455/522 |
| 6,889,056 | B2 * | 5/2005 | Shibutani | 455/522 |
| 6,898,437 | B1 * | 5/2005 | Larsen et al. | 455/522 |

| | | | |
|---|---|---|---|
| 2001/0036109 | A1 | 11/2001 | Jha et al. |
| 2002/0191643 | A1 | 12/2002 | Yun |

FOREIGN PATENT DOCUMENTS

| | | |
|---|---|---|
| EP | 1130834 | 9/2001 |
| EP | 1246385 | 10/2002 |
| EP | 1246385 A2 * | 10/2002 |
| JP | 2002-359882 | 12/2002 |

OTHER PUBLICATIONS

Yao et al., "Optimal Power Control law for Multimedia Multirate CDMA Systems", Apr. 28, 1996 through May 1, 1996, IEEE, vol. 1, pp. 392-396.*
ElBatt et al., "Power Management for THroughput Enhancement in Wireless Ad-hoc Networks", 2000, IEEE, vol. 3, pp. 1506-1513.*
Chattedee et al., MAC Layer Retransmissions in 1xtreme, Personal, Indoor and Mobile Radio Communications, IEEE International Symposium, Sep. 15-18, Piscataway, New Jersey (2002).
Deng et al., "An Adaptive Coding Scheme with Code Combining for Mobile Radio Systems," *IEEE Transactions on Vehicular Technology* 42(4):469-476 (2001).

(Continued)

*Primary Examiner*—Steven H Nguyen
*Assistant Examiner*—Adam Duda
(74) *Attorney, Agent, or Firm*—Turocy & Watson, LLP

(57) ABSTRACT

Systems and techniques are disclosed relating to wireless communications, and more specifically, to various systems and techniques for early termination of low rate traffic in a wireless network. A physical layer packet (PLP) grouping factor K configures the PLP into K groups and an ACK/NAK is received on each group.

13 Claims, 5 Drawing Sheets

OTHER PUBLICATIONS

OA dated Mar. 20, 2009 for Vietnamese Application Serial No. 1-2006-01630, 1 page.
OA dated May 8, 2009 for Chinese Application Serial No. 200580014097.0, 19 pages.
OA received May 27, 2009 for Mexican Application Serial No. PA/a/2006/010083, 5 pages.
OA dated Mar. 23, 2009 for Philippines Application Serial No. 1-2006-501724, 2 pages.
Deng, R.H., et al. "An Adaptive Coding Scheme With Code Combining for Mobile Radio Systems". IEEE Transactions on Vehicular Technology, IEEE Inc. New York, US, vol. 42, No. 4, Nov. 1, 1993 pp. 469-476, XP000421221, ISSN: 0018-9545, p. 496, Right-Hand Column, Paragraph 3, p. 471, Left-Hand Column, Paragraph 2.
Japanese Office Action for Japanese Application No. 2007-502003 dated Jun. 30, 2009, 9 pages.

* cited by examiner

EARLY TERMINATION OF LOW DATA RATE TRAFFIC IN A WIRELESS NETWORK

FIELD

The present disclosure relates generally to wireless communications, and more specifically, to various systems and techniques for early termination of low rate traffic in a wireless network.

BACKGROUND

In conventional wireless communications, an access network is generally employed to support communications for a number of mobile devices. An access network is typically implemented with multiple fixed site base stations dispersed throughout a geographic region. The geographic region is generally subdivided into smaller regions known as cells. Each base station may be configured to serve the mobile devices in its respective cell. An access network may not be easily reconfigured when there are varying traffic demands across different cellular regions.

In contrast to the conventional access network, ad-hoc networks are dynamic. An ad-hoc network may be formed when a number of wireless communication devices, often referred to as terminals join together to form a network. Terminals in ad-hoc networks can operate as either a host or router. Thus, an ad-hoc network may be easily reconfigured to meet existing traffic demands in a more efficient fashion. Moreover, ad-hoc networks do not require the infrastructure required by conventional access networks, making ad-hoc networks an attractive choice for the future.

Ultra-Wideband (UWB) is an example of a communications technology that may be implemented with ad-hoc networks. UWB provides high speed communications over a wide bandwidth. At the same time, UWB signals are transmitted in very short pulses that consume very little power. The output power of the UWB signal is so low that it looks like noise to other RF technologies, making it less interfering.

As more terminals are added to an access network, regardless whether the access network is a conventional network or an ad-hoc network, an added terminal creates more interference for terminals other than the terminal with which it is communicating. Thus, it is desirable to limit transmissions to avoid interference with other terminal communications.

SUMMARY

In one aspect of the present invention, a method of data transmission includes configuring a message into integer K groups, wherein each group comprises traffic channel data, transmitting a group, receiving an ACK/NAK on an ACK channel, and transmitting another group if a NAK was received on the ACK.

In another aspect of the present invention, a wireless terminal includes means for configuring a message into integer K groups, wherein each group comprises traffic channel data, means for transmitting a group, means for receiving an ACK/NAK on an ACK channel, and means for transmitting another group if a NAK was received on the ACK channel.

In yet another aspect of the present invention, a wireless terminal includes a controller for configuring a message into integer K groups, wherein each group comprises traffic channel data, a receiver for receiving an ACK/NAK, and a transmitter for transmitting a group comprising traffic channel data provided an ACK was not received on the group.

In a further aspect of the present invention, computer readable media embodying a program of instructions executable by a computer program may be used to configure a message into integer k groups, wherein each group comprises traffic channel data, transmit a group, receive an ACK/NAK on an ACK channel, and transmit another group if a NAK was received on the ACK channel.

It is understood that other embodiments of the present invention will become readily apparent to those skilled in the art from the following detailed description, wherein various embodiments of the invention are shown and described by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Aspects of the present invention are illustrated by way of example, and not by way of limitation, in the accompanying drawings, wherein.

DETAILED DESCRIPTION

Figure 1:
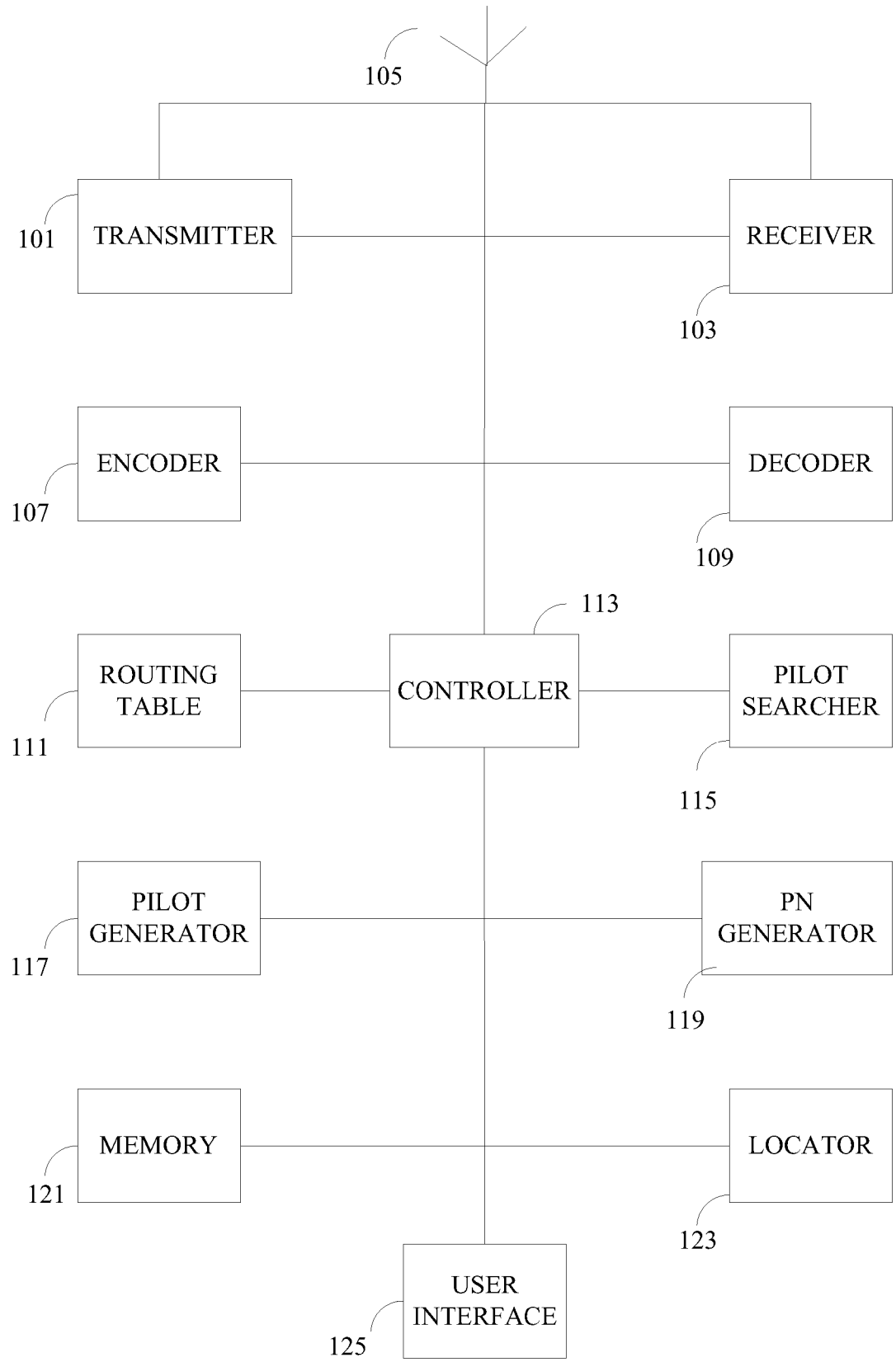
FIG. 1 illustrates a terminal that may be used in a network.

The detailed description set forth below in connection with the appended drawings is intended as a description of various embodiments of the present invention and is not intended to represent the only embodiments in which the present invention may be practiced. Each embodiment described in this disclosure is provided merely as an example or illustration of the present invention, and should not necessarily be construed as preferred or advantageous over other embodiments. The detailed description includes specific details for the purpose of providing a thorough understanding of the present invention. However, it will be apparent to those skilled in the art that the present invention may be practiced without these specific details. In some instances, well-known structures and devices are shown in block diagram form in order to avoid obscuring the concepts of the present invention. Acronyms and other descriptive terminology may be used merely for convenience and clarity and are not intended to limit the scope of the invention.

The word "exemplary" is used exclusively herein to mean "serving as an example, instance, or illustration." Any embodiment described herein as "exemplary" is not necessarily to be construed as preferred or advantageous over other embodiments.

Numerous multiple access techniques exist to support simultaneous communications in a network. A Frequency Division Multiple Access (FDMA) scheme, by way of example, is a very common technique. FDMA typically involves allocating distinct portions of the total bandwidth to individual communications between two terminals in the ad-hoc network. While this scheme may be effective for uninterrupted communications, better utilization of the total bandwidth may be achieved when such constant, uninterrupted communication is not required.

Other multiple access schemes include Time Division Multiple Access (TDMA). These TDMA schemes may be particularly effective in allocating limited bandwidth among a number of terminals which do not require uninterrupted communications. TDMA schemes typically dedicate the entire bandwidth to each communication channel between two terminals at designated time intervals.

Code Division Multiple Access (CDMA) techniques may be used in conjunction with TDMA to support multiple communications during each time interval. This may be achieved by transmitting each communication or signal in a designated time interval with a different code that modulates a carrier, and thereby, spreads the spectrum of the signal. The transmitted signals may be separated in the receiver terminal by a demodulator that uses a corresponding code to de-spread the desired signal. The undesired signals, whose codes do not match, are not de-spread in bandwidth and contribute only to noise.

Where there is only a single band for both uplink and downlink communication, the transfer of information between two terminals (users) needs to be time division duplexed (TDDed).

In the following detailed description, various aspects of the present invention may be described in the context of a time division duplex (TDD) wireless communications system. While these inventive aspects may be well suited for use with this application, those skilled in the art will readily appreciate that these inventive aspects are likewise applicable for use in various other communication environments. Accordingly, any reference to a TDD communications system is intended only to illustrate the inventive aspects, with the understanding that such inventive aspects have a wide range of applications.

FIG. 1 illustrates a terminal that may be used in an access network. As shown in FIG. 1, the terminal may include a transmitter 101, a receiver 103, an antenna 105, an encoder 107, a decoder 109, a routing table 111, a controller 113, a searcher 115, a pilot generator 117, a PN generator 119, a memory 121 a locator 123 and a user interface 125.

The transmitter 101 may transmit information received from the controller 113 to the antenna 105. The receiver 103 may receive information from the antenna 105 and deliver it to the controller 113. The encoder 107 may encode information for transmission, again operating under the control of the controller 113. The encoder 107 may use any encoding techniques known in the art, such as frequency encoding, phase encoding, time encoding, address encoding or spread spectrum encoding.

In an embodiment, the encoder 107 comprises source coding and physical layer coding. Source coding includes, but is not limited to, for example, encoding voice, data, and video. Physical layer coding includes, but is not limited to, for example, channel coding, interleaving, and modulation. Channel coding includes, but is not limited to Turbo coding.

A time division duplex feature may be used in conjunction with the encoding feature or without it. Similarly, the encoding feature may be used with or without the time division duplex feature.

The decoder 109 my decode information received from the receiver 103 under the control of the controller 113. As with the encoder, the decoder 109 may decode information based on frequency, phase, time, address or a spread spectrum code.

The routing table 111 may be used to store routing information and may be used in those embodiments in which routing is accomplished in connection with a routing table.

The pilot searcher 115 may be used in association with information received by the receiver 103 under the control of the controller 113 to search received information for pilots.

The pilot generator 117 may be used to generate pilots that, under the control of the controller 113, are transmitted by the transmitter 101.

The PN generator 119 may be used to generate one or more PN sequence codes that, under the control of the controller, may be used by the terminal to spread information for other terminals, to de-spread information from other terminals, to control the times during which the terminal transmits and receives, and to determine the times during which a linked terminal is scheduled to receive information, all as explained above in more detail.

The locator 123 may determine the location of the terminal. It may include a GPS receiver. It may instead use magnetic location techniques or determine location based on one or more signals that are received by the terminal. Other location techniques may also be used.

The user interface 125 facilitates communication between the terminal and the user of the terminal. The user interface may include one or more input devices, such as a keyboard, mouse, touch screen, microphone, camera or a communication link with another system. Similarly, the user interface may include one or more output devices, such as a display, loudspeaker, headset or a communication link with another system.

The memory 121 may be used by the controller and/or other components of the terminal to store information needed by the terminal, permanently and/or temporarily, such as information from the user interface, information for the user interface, location information, PN codes, pilot information, routing information, encoding information and/or decoding information.

The terminal may include additional components and/or may not include all of the components discussed above in connection with FIG. 1. For example, one or more terminals on the network might not include a user interface and thus might not sink or source data, but merely act as forwarding terminals and/or provide other communication services to other terminals on the network.

The terminal may also include power control systems to control the power level of the signals that are transmitted. Such systems may be open loop and set the power level to a target terminal based on the strength of the signal that is received from that terminal. Such systems may be closed loop and allow the power level of the terminal to be set by another terminal, such as a terminal that is receiving the signal from the terminal whose power level is being set. A combination of these approaches may also be used.

Low rate data traffic between terminals in a wireless network can take many time periods to transmit from a source terminal to a destination terminal. For example, voice frames run at low bit rates ($R_b$ kilo-bits per second) and occupy a large number of slots. A frame comprises a number of slots. A slot comprises a number of bits.

In an embodiment, fixed length voice frames from a vocoder are divided into multiple slots of much shorter duration. Voice data between terminals are coded and decoded by a vocoder, which may utilize any of the vocoder protocols known in the art.

In multiple access communication, interference is reduced by a terminal requesting transmission to be terminated upon successful reception of only a fraction of the total number of slots to be transmitted. The termination request is conveyed via an ACK channel.

In an embodiment, an acknowledgment (ACK) is sent on a group of slots rather than on a slot-by-slot basis in order to reduce overhead while at the same time providing considerable capacity gains.

To facilitate data transmission, a forward link comprises four time multiplexed channels in an embodiment: the pilot channel, power control channel, traffic channel, and control channel. In an embodiment, a forward link pilot channel provides a pilot signal, which is used by terminals for initial acquisition, phase recovery, timing recovery, and combining. In an embodiment, the pilot signal is also used by terminals to perform a carrier-to-interference (C/I) measurement.

The control channel is also referred to as an acknowledgment channel when a wireless system uses the control channel to acknowledge (ACK) or negative acknowledge (NAK) received data. In an embodiment, an ACK channel is a subset of the control channel. In another embodiment, an ACK channel is a separate channel from the control channel.

A forward link refers to transmission from a source terminal to a destination terminal and a reverse link refers to transmission from the destination terminal to the source terminal.

Transmitting physical layer packets at low rates can take a significantly long time (several slots needed) thereby, increasing interference in the network. This interference can be reduced by exchanging data between terminals in the form of groups, wherein each packet comprises a number of groups and each group comprises a number of slots.

Each group has an associated ACK/NAK. The ACK/NAK is transmitted on the ACK channel, which allows a receiver to inform a transmitter to stop transmitting the remaining groups of a packet if the receiver was successfully able to decode the packet.

In an embodiment, a physical layer packet (PLP) is partitioned into two channels: (1) Overhead and (2) Payload or Traffic. In an embodiment, the overhead channels include pilot, control, ACK and power control channels.

A PLP grouping factor K (K ∈ integer) configures the PLP into K groups, each group having the same message. In an embodiment, a method of exchanging information between two terminals is to set K=1 and construct a PLP with the entire overhead and payload in a single group. In this case, packet transmission cannot be terminated early since the entire packet is transmitted.

Figure 2:
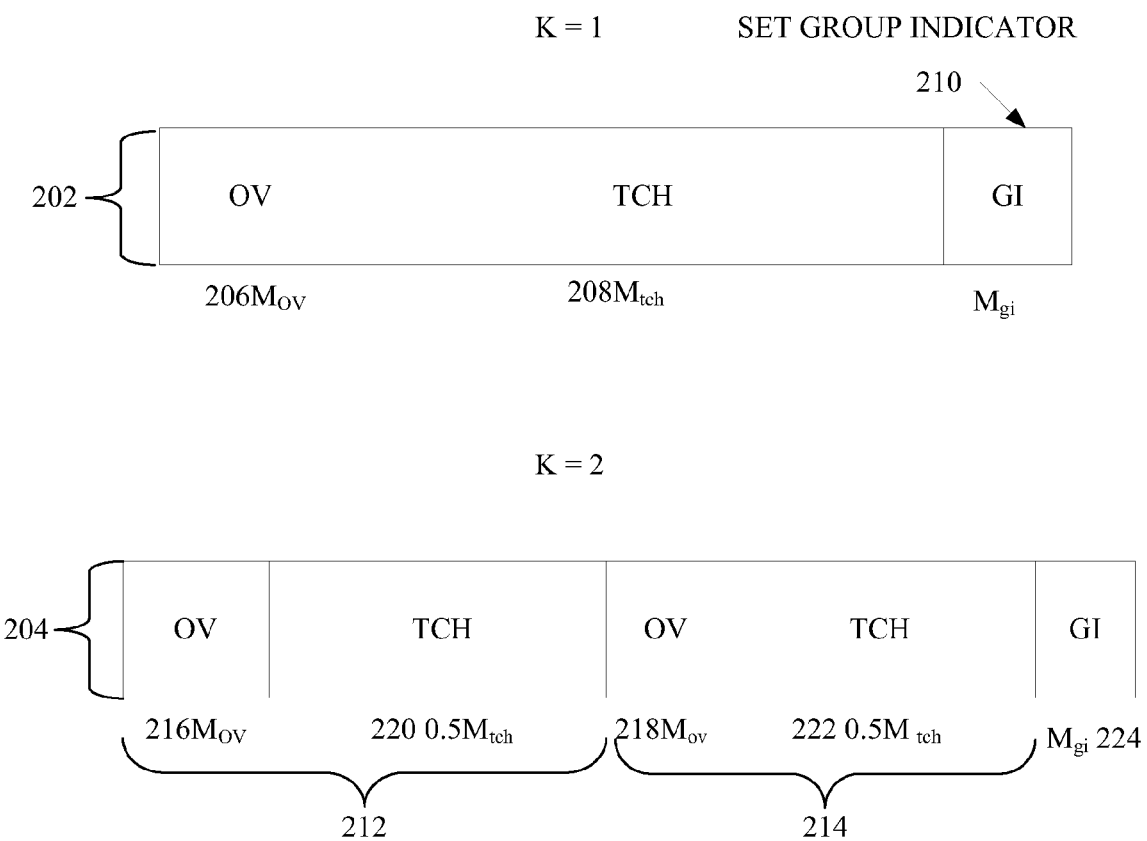
FIG. 2 shows a message configured as a single group and the same message configured as two groups for a time division multiplexed (TDM) system.

By choosing a different value of K (K>1), the original packet is configured into K groups with each group having overhead channels. Each group has the same number of slots as the original single group packet and 1/Kth the original number of traffic slots. For example, a message 202 configured as a single group and the same message 204 configured as two groups for a time division multiplexed system is shown in FIG. 2. In this context, message and packet are used interchangeably.

The message 202 configured as a single group, i.e., with K=1, has $M_{ov}$ overhead slots 206 and $M_{tch}$ traffic slots 208. In addition, the message 202 has a group indicator (GI) 210 that has $M_{gi}$ slots and indicates the number of groups for the message.

The message 204 configured as two groups, i.e., with K=2, has two groups 212, 214, with each group having $M_{ov}$ overhead slots 216, 218, and $M_{tch}/2$ traffic slots 220, 222. In addition, the message 204 has a group indicator (GI) 224 that has $M_{gi}$ slots and indicates the number of groups for the message.

The message 204 is transmitted in both traffic slots 220, 222 at a fraction of the transmission power that it would have been transmitted had the message 204 been sent in one group. In an embodiment, groups are transmitted at a transmission power of 1/K.

Transmitting a group at a fractional power means less interference for other terminals.

Regardless whether a message is configured as a single group or as two groups, the overhead remains constant. The amount of overhead is due to the amount needed for pilot power requirements, and due to the amount needed for transmission of ACK and power control channels. The percentage overhead for a group can be calculated as:

$$\% \, OV = 100*(K*M_{ov})/(K*M_{ov}+M_{tch}) \quad (1)$$

In an embodiment, the value of K is selected so as not to exceed an overhead threshold set by an overall system requirement. In an embodiment, the value for K can be dynamically adjusted on a packet-by-packet basis by introducing a channel in the PLP called Group Indicator (GI) channel. For example, if K could take on any integer value from one (1) to four (4), then the GI channel can consist of two bits to indicate one of four values of K.

The optimum value of K is such that the overall interference in the network is reduced. The optimum value of K is a function of channel conditions. For example, given $M_{tch}$ traffic slots in a packet and channel conditions such that the entire packet can be decoded without errors that can be corrected in $M_{tch}/4$ slots, then the optimum value of K may be four. It would be apparent to those skilled in the art that the function to determine K can be any statistical method known in the art for optimizing a parameter.

In an embodiment, the optimum value of K is such that just enough information about the packet has been obtained by the receiver in a single group to decode the packet. Optimizing K shortens the duration of packet transmission since packet transmission is terminated once sufficient information has been obtained by the receiver to decode the entire packet. Configuring a message into K groups provides the receiver more opportunities to send an ACK to the transmitter and enables the transmitter to terminate packet transmission earlier than would be the case if the message was not configured into groups.

Not configuring a message into a number of groups results in transmissions being longer than would be the case if the message were configured into groups. Configuring a message into a number of groups greater than the optimum value of K results in greater retransmissions and therefore causes more interference to other terminals. Thus, there is a tradeoff in the selection of the value for K between early termination of a packet and having to retransmit groups.

Figure 3:
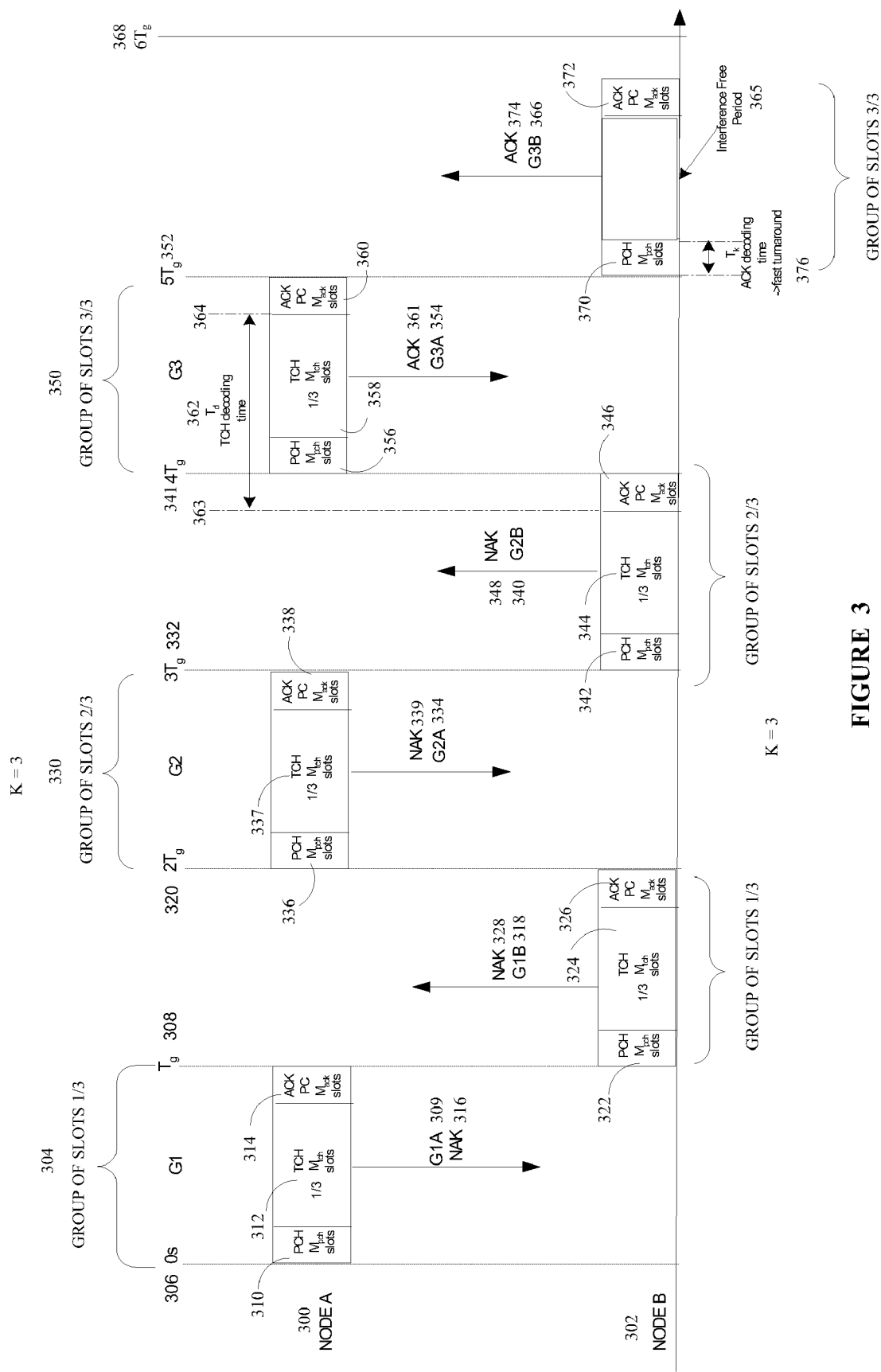
FIG. 3 shows a terminal node A in communication with a terminal node B in accordance with an embodiment employing time division multiplexing of channels.

FIG. 3 shows a terminal node A 300 in communication with a terminal node B 302 in accordance with an embodiment employing time division multiplexing of channels. FIG. 3 shows an exchange of slots of data between terminal node A 300 and terminal node B 302.

As shown in FIG. 3, the number of groups K is three, i.e., messages can be sent in three groups. A message is sent in three groups of traffic data from terminal node A 300 to terminal node B 302. A message is sent in two of three groups of traffic data from terminal node B 302 to terminal node A 300.

The $M_{tch}$ slots as shown in FIG. 3 is ⅓ the number of slots $M_{tch}$ would have been had the messages sent between the terminal nodes been sent as one group. Messages are transmitted in traffic slots at a fraction of the transmission power that they would have been transmitted had the messages been sent in one group.

Terminal node A 300 sends a first group of slots G1 304 to a terminal node B 302 during a first time period. The first time period is from 0s 306 to $T_g$ 308. The group of slots G1A 309 includes $M_{pch}$ slots 310 for the pilot channel, ⅓$M_{tch}$ slots 312 for the traffic channel, and $M_{ack}$ slots 314 for the ACK channel and the power control channel. Initially, the terminal node A 300 sends a NAK 316 in the ACK channel to terminal node B 302.

Terminal node B 302 sends a first group of slot G1B 318 to terminal node A 300 during a second time period. The second time period is from $T_g$ 308 to 2$T_g$ 320. The group of slots G1B 318 includes $M_{pch}$ slots 322 for the pilot channel, ⅓$M_{tch}$ slots 324 for the traffic channel, and $M_{ack}$ slots 326 for the ACK channel and the power control channel. Assuming terminal node B 302 detects errors in decoding the traffic channel data 312, terminal node B 302 sends a NAK 328 to terminal node A 300.

In an embodiment, the group indicator is transmitted in the ACK channel of the last group G3 350. It would be apparent to those skilled in the art that the group indicator can be configured as part of any of the groups from source node to a destination node.

It would also be apparent to those skilled in the art that the group indicator can be configured as part of any channel in a group. It would further be apparent to those skilled in the art that other channels can be part of a group. For example, guard channels can be included in each group. For the sake of clarity, only some of the most important channels are shown in FIG. 3.

Terminal node A 300 sends a group of slots G2 330 to a terminal node B 302 during a third time period. The third time period is from 2$T_g$ 320 to 3$T_g$ 332. The group of slots G2A 334 includes $M_{pch}$ slots 336 for the pilot channel, ⅓$M_{tch}$ slots 337 for the traffic channel, and $M_{ack}$ slots 338 for the ACK channel and the power control channel. Assuming terminal node A 300 detects errors in decoding the traffic channel data 324, terminal node A 300 sends a NAK 339 to terminal node B 302.

Terminal node B 302 sends a group of slots G2B 340 to terminal node A 300 during a fourth time period. The fourth time period is from 3$T_g$ 332 to 4$T_g$ 341. The group of slots G2B 340 includes $M_{pch}$ slots 342 for the pilot channel, ⅓$M_{tch}$ slots 344 for the traffic channel, and $M_{ack}$ slots 346 for the ACK channel and the power control channel. Assuming terminal node B 302 detects errors in decoding the traffic channel data 339, terminal node B 302 sends a NAK 348 to terminal node A 300.

Terminal node A 300 sends a group of slots G3 350 to a terminal node B during a fifth time period. The fifth time period is from 4$T_g$ 341 to 5$T_g$ 352. The group of slots G3A 354 includes $M_{pch}$ slots 356 for the pilot channel, ⅓$M_{tch}$ slots 358 for the traffic channel, and $M_{ack}$ slots 360 for the ACK channel and the power control channel. Assuming terminal node A 300 does not detect errors in decoding the traffic channel data 344, terminal node A 300 sends an ACK 361 to terminal node B 302.

In accordance with an embodiment, terminal node A 300 decodes the traffic channel 344 from terminal node B 302 during a traffic channel decoding time $T_d$ 362. The traffic channel decoding time $T_d$ 362 is a time period from about the time 363 when terminal node B 302 finishes sending traffic channel data 344 to terminal node A 300 to about the time 364 terminal node A 300 finishes sending traffic channel data 358 to terminal node B 302.

Because terminal node A 300 sent an ACK 361 to terminal node B 302, terminal node B 302 does not send the last group of traffic data back to terminal node A 300. Consequently, the period of time in which terminal node B 302 would have sent traffic data had it received a NAK from terminal node A, but which no traffic is sent when an ACK is received results in an interference free period 365. During the interference free period 365, there is no traffic data sent from terminal node B 302 to terminal node A 300, which otherwise could have provided interference for other terminals during the interference free period 365.

Terminal node B 302 sends a group of slots G3A 366 to terminal node A 300 during a sixth time period. The sixth time period is from 5$T_g$ 352 to 6$T_g$ 368. The group of slots G3B 366 includes $M_{pch}$ slots 370 for the pilot channel and $M_{ack}$ slots 372 for the ACK channel and the power control channel. Assuming terminal node B 302 does not detect errors in decoding the traffic channel data 358, terminal node B 302 sends an ACK 374 to terminal node A 300.

Terminal node B 302 decodes an ACK/NAK it receives from terminal node A during an ACK/NAK decoding time $T_k$, which is between the time a terminal node receives the ACK/NAK and the time the terminal node would begin sending traffic channel data.

Figure 4:
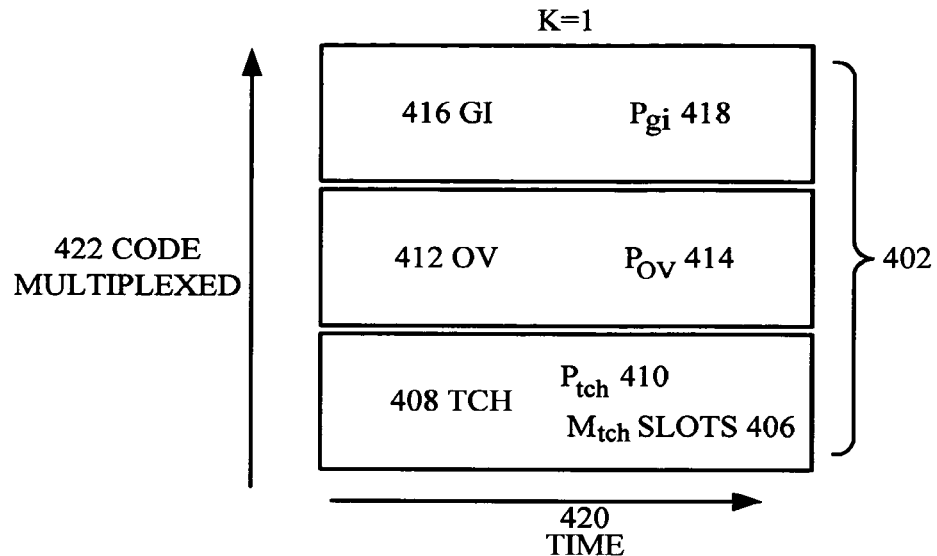
FIG. 4 shows a message configured as a single group and the same message configured as two groups for a code division multiplexed (CDM) system.
Figure 4:
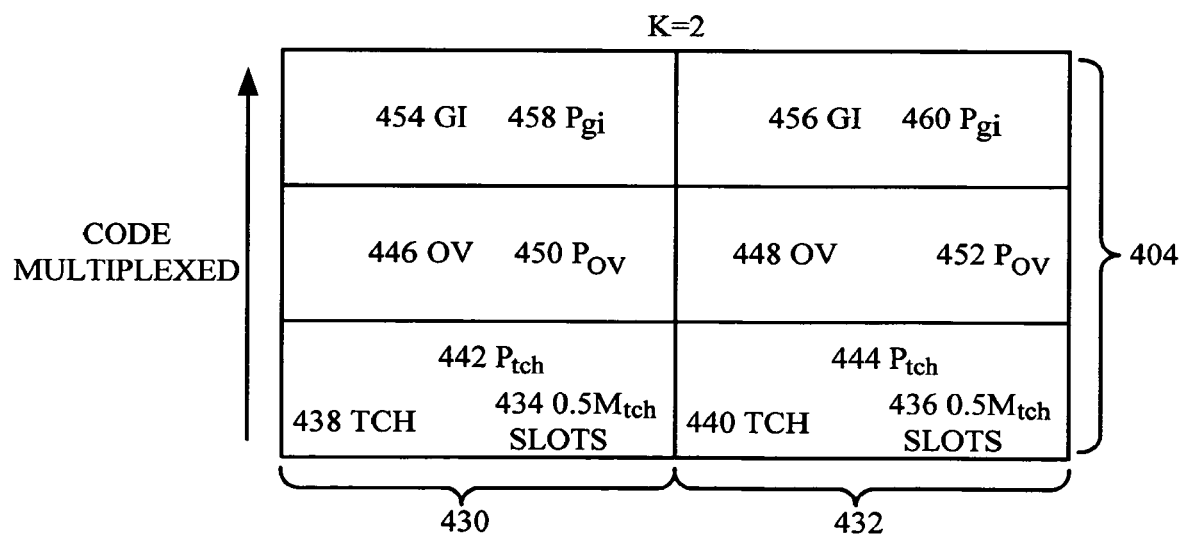

FIG. 4 shows a message 402 configured as a single group and the same message 404 configured as two groups for a code division multiplexed (CDM) system. The message 402 configured as a single group, i.e., with K=1, has $M_{tch}$ traffic slots 406. A traffic channel TCH 408 has an allocated transmission power $P_{tch}$ 410. An overhead channel OV 412 has an allocated transmission power $P_{ov}$ 414. A group indicator (GI) channel 416 has an allocated transmission power $P_{gi}$ 418. The transmission powers of FIG. 4 are not drawn to scale. The horizontal axis 420 is time and the vertical axis 422 is a multiplexed code.

The message 404 configured as two groups, i.e., with K=2, has two groups 430, 432, with each group having $M_{tch}$/2 traffic slots 434, 436. Traffic channels 438, 440 have allocated transmission powers $P_{tch}$ 442, 444, respectively. Overhead channels 446, 448 have allocated transmission powers $P_{ov}$ 450, 452, respectively. Group indicators (GI) channels 454, 456 have allocated transmission powers $P_{gi}$ 458, 460, respectively.

Figure 5:
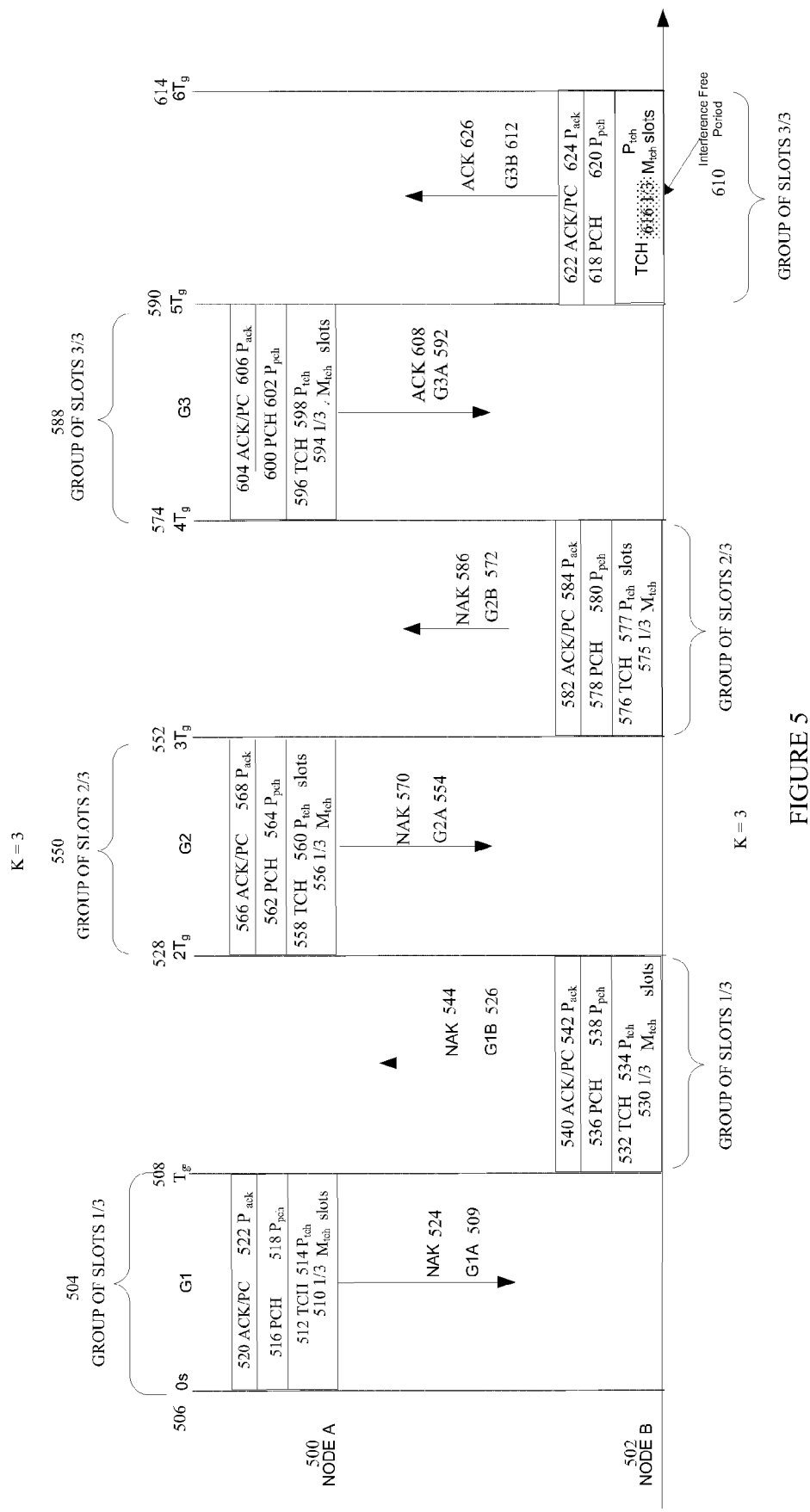
FIG. 5 shows a terminal node A in communication with a terminal node B in accordance with an embodiment employing code division multiplexing of channels.

FIG. 5 shows a terminal node A 500 in communication with a terminal node B 502 in accordance with an embodiment employing code division multiplexing of channels. FIG. 5 shows an exchange of slots of data between terminal node A 500 and terminal node B 502.

As shown in FIG. 5, the number of groups K is three, i.e., messages can be sent in three groups. A message is sent in three groups of traffic data from terminal node A 500 to terminal node B 502. A message, which is to be sent in three groups to terminal node A 500, instead is sent in two of three groups of traffic data from terminal node B 502 to terminal node A 500 as a result of receiving ACK at terminal node B 502 prior to sending the third group.

The $M_{tch}$ slots as shown in FIG. 5 is ⅓ the number of slots $M_{tch}$, which would have been used had the messages sent between the terminal nodes as one group. Messages are transmitted in traffic slots at a fraction of the transmission power that they would have been transmitted had the messages been sent in one group.

Terminal node A 500 sends a first group of slots G1 504 to a terminal node B 502 during a first time period. The first time period is from 0s 506 to $T_g$ 508. The first group of slots G1A 509 includes ⅓$M_{tch}$ slots 510 for the traffic channel. The traffic channel TCH 512 has transmission power $P_{tch}$ 514.

Pilot channel PCH 516 has transmission power $P_{pch}$ 518. ACK/Power Control channel 520 has transmission power $P_{ack}$ 522. Initially, the terminal node A 500 sends a NAK 524 in the ACK channel to terminal node B 502.

Terminal node B 502 sends a first group of slots G1B 526 to terminal node A 500 during a second time period. The second time period is from $T_g$ 508 to $2T_g$ 528. The group of slots G1B 526 includes $\frac{1}{3}M_{tch}$ slots 530 for the traffic channel TCH 532. The traffic channel TCH 532 has transmission power $P_{tch}$ 534. Pilot channel PCH 536 has transmission power $P_{pch}$ 538. ACK/Power Control channel 540 has transmission power $P_{ack}$ 542.

Assuming terminal node B 502 detects errors in decoding the traffic channel data 512, terminal node B 502 sends a NAK 544 to terminal node A 500.

Terminal node A 500 sends a group of slots G2 550 to a terminal node B during a third time period. The third time period is from $2T_g$ 528 to $3T_g$ 552. The group of slots G2A 554 includes $\frac{1}{3}M_{tch}$ slots 556 for the traffic channel TCH 558. The traffic channel TCH 558 has transmission power $P_{tch}$ 560. Pilot channel PCH 562 has transmission power $P_{pch}$ 564. ACK/Power Control channel 566 has transmission power $P_{ack}$ 568.

Assuming terminal node A 500 detects errors in decoding the traffic channel data 532, terminal node A 500 sends a NAK 570 to terminal node B 502.

Terminal node B 502 sends a group of slots G2B 572 to terminal node A 500 during a fourth time period. The fourth time period is from $3T_g$ 552 to $4T_g$ 574. The group of slots G2B 572 includes $\frac{1}{3}M_{tch}$ slots 575 for the traffic channel TCH 576. Pilot channel PCH 578 has transmission power $P_{pch}$ 580. The traffic channel TCH 576 has transmission power $P_{tch}$ 577. ACK/Power Control channel 582 has transmission power $P_{ack}$ 584.

Assuming terminal node B 502 detects errors in decoding the traffic channel data 558, terminal node B 502 sends a NAK 586 to terminal node A 500.

Terminal node A 500 sends a group of slots G3 588 to a terminal node B 502 during a fifth time period. The fifth time period is from $4T_g$ 574 to $5T_g$ 590. The group of slots G3A 592 includes $\frac{1}{3}M_{tch}$ slots 594 for the traffic channel TCH 596. The traffic channel TCH 596 has transmission power $P_{tch}$ 598. Pilot channel PCH 600 has transmission power $P_{tch}$ 602. ACK/Power Control channel 604 has transmission power $P_{ack}$ 606.

Assuming terminal node A 500 does not detect errors when decoding the traffic channel data 576, terminal node A 500 sends an ACK 608 to terminal node B 502.

Because terminal node A 500 sent an ACK 608 to terminal node B 502, terminal node B 502 does not send traffic data back to terminal node A 500 during the next time period. Consequently, the period of time in which terminal node B 502 would have sent traffic data had it received a NAK from terminal node A, but which no traffic is sent when an ACK is received results in an interference free period 610. There is no traffic data sent from terminal node B 502 to terminal node A 500, which otherwise could have provided interference for other terminals during the interference free period 610.

Terminal node B 502 sends a group of slots G3B 612 to terminal node A 300 during a sixth time period. The sixth time period is from $5T_g$ 590 to $6T_g$ 614. The group of slots G3B 612 includes $\frac{1}{3}M_{tch}$ slots 616. Pilot channel PCH 618 has transmission power $P_{ack}$ 620. ACK/Power Control channel 622 has transmission power $P_{ack}$ 624.

Assuming terminal node B 502 does not detect errors when decoding the traffic channel data 596, terminal node B 502 sends an ACK 626 to terminal node B 502.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC. The ASIC may reside in the terminal, or elsewhere. In the alternative, the processor and the storage medium may reside as discrete components in the terminal, or elsewhere.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of data transmission in a wireless terminal, comprising:
    configuring a message with a controller of the wireless terminal into integer K groups as a function of channel conditions, wherein each group comprises traffic channel data;
    transmitting a group at a fractional transmission power with a transmitter of the wireless terminal to minimize interference;
    receiving an ACK/NAK on an ACK channel with a receiver of the wireless terminal; and
    transmitting another group with the transmitter if a NAK was received on the ACK channel.

2. The method of claim 1, wherein each group includes the same traffic channel data.

3. The method of claim 2, wherein the value of K is determined based in part on an overhead threshold set by an overall system requirement.

4. The method of claim 1, wherein the value of K is determined such that traffic data is decoded without errors by the time a $K^{th}$ group has been decoded.

5. A wireless terminal, comprising:
    means for configuring a message into integer K groups, wherein each group comprises traffic channel data, and wherein K is determined based in part on an optimal fractional transmission power and channel conditions;

means for transmitting a group at the optimal fractional transmission power to minimize interference;

means for receiving an ACK/NAK on an ACK channel; and means for transmitting another group if a NAK was received on the ACK channel.

6. The wireless terminal of claim 5, wherein each group includes the same traffic channel data.

7. The wireless terminal of claim 6, wherein the value of K is further based in part on an overhead threshold.

8. The wireless terminal of claim 5, wherein the value of K is determined such that traffic data is decoded without errors by the time a $K^{th}$ group has been decoded.

9. A wireless terminal, comprising:
a controller for configuring a message into integer K groups as a function of channel conditions, wherein each group comprises traffic channel data, the message having an ungrouped transmission time;

a receiver for receiving an ACK/NAK; and a transmitter for transmitting a group comprising traffic channel data provided an ACK was not received on the group, wherein the transmitter transmits the group at a fractional transmission power to produce minimal interference, and wherein the transmitter terminates group transmission earlier than the ungrouped transmission time based on a determination that the receiver was successfully able to decode the message.

10. The wireless terminal of claim 9, wherein each group includes the same traffic channel data.

11. The wireless terminal of claim 10, wherein the value of K is based in part on a system overhead threshold.

12. The wireless terminal of claim 11, wherein the value of K is determined such that traffic data is decoded without errors by the time a $K^{th}$ group has been decoded.

13. Computer readable media embodying a program of instructions executable by a computer program, said computer readable media comprising:
a computer readable program code means for configuring a message into integer K groups as a function of channel conditions, wherein each group comprises traffic channel data;

a computer readable program code means for transmitting a group at a fractional transmission power to minimize interference;

a computer readable program code means for receiving an ACK/NAK on an ACK channel; and a computer readable program code means for transmitting another group if a NAK was received on the ACK channel.

* * * * *